United States Patent
Zhang et al.

(10) Patent No.: US 12,238,013 B1
(45) Date of Patent: Feb. 25, 2025

(54) COMMUNICATION AND COMPUTATION INTEGRATED NETWORK ARCHITECTURE AND RESOURCE ADAPTATION METHOD

(71) Applicant: BEIJING JIAOTONG UNIVERSITY, Beijing (CN)

(72) Inventors: Weiting Zhang, Beijing (CN); Dong Yang, Beijing (CN); Hongke Zhang, Beijing (CN); Peixi Liao, Beijing (CN); Jiadong Ren, Beijing (CN); Ruibin Guo, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 18/906,863

(22) Filed: Oct. 4, 2024

(30) Foreign Application Priority Data

Jan. 17, 2024 (CN) .......................... 202410065417.X (51) Int. Cl.
| | |
|---|---|
| *G06F 9/46* | (2006.01) |
| *G06F 9/48* | (2006.01) |
| *G06F 9/50* | (2006.01) |
| *H04L 47/80* | (2022.01) |
| *H04L 47/83* | (2022.01) |

(52) U.S. Cl.
CPC .......... *H04L 47/805* (2013.01); *G06F 9/4887* (2013.01); *G06F 9/5044* (2013.01); *H04L 47/83* (2022.05); *G06F 2209/501* (2013.01); *G06F 2209/5019* (2013.01); *G06F 2209/503* (2013.01)

(58) Field of Classification Search
CPC ................. G06F 9/4887; G06F 9/5044; G06F 2209/501; G06F 2209/5019; G06F 2209/503
See application file for complete search history.

(56) References Cited

FOREIGN PATENT DOCUMENTS

| CN | 109800072 A | * 5/2019 | ............. Y02D 10/00 |
| CN | 113411369 A | 9/2021 | |
| CN | 115333962 A | * 11/2022 | ......... H04L 41/5003 |

OTHER PUBLICATIONS

Wang et al., Adaptive Dispatching of Tasks in the Cloud, arXiv, Jan. 2015, 10 pages. (Year: 2015).*

(Continued)

*Primary Examiner* — Diem K Cao
(74) *Attorney, Agent, or Firm* — Thomas | Horstemeyer LLP.

(57) ABSTRACT

A communication and computation integrated network architecture and a resource adaptation method are provided. The network architecture includes: a computing service layer configured to extract features for each computation task of a computing user according to a quality of service requirement and experience requirement of the computation task to obtain an attribute feature of the computation task; a resource integration adaptation layer configured to carry out task dispatching and resource allocation according to total computing resources and attribute features of all computation tasks to obtain an optimal task dispatching decision and an optimal resource allocation decision; a computation and network component layer, including a plurality of types of network components, configured to forward and process the computation tasks according to the optimal task dispatching decision and the optimal resource allocation decision.

6 Claims, 4 Drawing Sheets

(56) References Cited

OTHER PUBLICATIONS

Movahedi et al., An efficient population-based multi-objective task scheduling approach in fog computing systems, SpringerOpen, 2021, 31 pages. (Year: 2021).*

Fan et al., QoE-oriented Dependent Task Scheduling under Multi-dimensional QoS Constraints over Distributed Networks, arXiv, Dec. 2023, 14 pages. (Year: 2023).*

First Office Action, issued by China Patent Office, CN App. 202410065417.X, issued Feb. 28, 2024.

* cited by examiner

| Total computing resources, all computation tasks of a computing user and attribute features of each computation task are acquired | S1 |

↓

| Task dispatching and resource allocation are carried out on all the computation tasks according to the total computing resources and the attribute features of all the computation tasks to obtain an optimal task dispatching decision and an optimal resource allocation decision | S2 |

↓

| All the computation tasks are forwarded and processed according to the optimal task dispatching decision and the optimal resource allocation decision | S3 |

_(1)_
COMMUNICATION AND COMPUTATION INTEGRATED NETWORK ARCHITECTURE AND RESOURCE ADAPTATION METHOD

CROSS-REFERENCE TO RELATED APPLICATION

This patent application claims the benefit and priority of Chinese Patent Application No. 202410065417.X filed with the China National Intellectual Property Administration on Jan. 17, 2024, the disclosure of which is incorporated by reference herein in its entirety as part of the present application.

TECHNICAL FIELD

The present disclosure relates to the technical field of industrial networks, in particular to a communication and computation integrated network architecture and a resource adaptation method.

BACKGROUND

With the advent of the era of intelligent everything, various new network scenarios have emerged, such as metaverse, ultra-high-speed railway, intelligent industrial Internet of Things and so on. A large number of terminals are connected to the Internet, which generates a large amount of data that needs to be transmitted and processed efficiently at the edge of the network. Therefore, how to promote efficient computing is very important to support rich advanced services in new network scenarios. Driven by powerful computing capacity, cloud computing has greatly promoted the development of intelligent services. However, long-distance data transmission is plagued by long response delay. In order to provide low-latency computing services, multi-access edge computing comes into being. That is, computing resources are gathered from the cloud to the edge, such as base stations, industrial gateways or roadside units. In addition, considering the data privacy laws and regulations, distributed computing can utilize scattered computing resources in synergy manner. However, with the development of diversified, customized and intelligent computation tasks, a single computing model can no longer meet the increasingly complex requirements of Quality of Service (QoS) and Quality of Experience (QoE). In this case, if a plurality of computing paradigms can be integrated into a unified computing platform, the massive concurrent computation tasks can be arranged globally and effectively, and high-level service requirements can be effectively guaranteed. Therefore, it is very necessary to develop an intelligent resource adaptation algorithm to realize the dynamic allocation of multi-dimensional resources on the unified computing platform. In order to improve the computing efficiency, it is necessary to further study how to dispatch massive concurrent computation tasks while satisfying the differentiation and strict requirements.

SUMMARY

The present disclosure aims to provide a communication and computation integrated network architecture and a resource adaptation method, which can integrate various computing paradigms into a unified computing platform. It makes up for the defect of loose communication and computing adaptation of the traditional network architecture, thereby achieving efficient global arrangement and dispatch of the massive and highly concurrent computation tasks, and effectively ensuring diversified service requirements of computation tasks.

In order to achieve the above purpose, the present disclosure provides the following schemes.

In a first aspect, the present disclosure provides a communication and computation integrated network architecture, which includes a computing service layer, a resource integration adaptation layer and a computation and network component layer.

Where the computing service layer is configured to extract features for each computation task of a computing user according to a QoS requirement and a QoE requirement of the computation task to obtain an attribute feature of the computation task; and the computation task includes determining start and stop of a switch of a train and processing audio/video signals of the train.

The resource integration adaptation layer is configured to carry out task dispatching and resource allocation according to total computing resources and attribute features of all computation tasks to obtain an optimal task dispatching decision and an optimal resource allocation decision.

The computation and network component layer, including a plurality of types of network components, is configured to forward and process the computation tasks according to the optimal task dispatching decision and the optimal resource allocation decision.

In a second aspect, the present disclosure provides a resource adaptation method based on a communication and computation integrated network architecture described in the first aspect, including:

total computing resources, all computation tasks of the computing user and the attribute features of each computation task are acquired, where the computation task includes determining the start and stop of the switch of the train and processing the audio/video signals of the train;

the task dispatching and the resource allocation are carried out on all the computation tasks according to the total computing resources and the attribute features of all the computation tasks to obtain the optimal task dispatching decision and the optimal resource allocation decision;

all the computation tasks are forwarded and processed according to the optimal task dispatching decision and the optimal resource allocation decision.

In some embodiments, the task dispatching and the resource allocation are carried out on all the computation tasks according to the total computing resources and the attribute features of all the computation tasks to obtain the optimal task dispatching decision and the optimal resource allocation decision, which specifically includes: the computation tasks are dispatched by using an inter-domain controller according to the total computing resources and the attribute features of all the computation tasks to obtain the optimal task dispatching decision, where the optimal task dispatching decision is a joint dispatching scheme of the computation tasks, which includes computing domain allocation of each of the computation tasks; the total computing resources include available resource information of all computing domains; an intra-domain controller is used to allocate resources to computation tasks dispatched to each computing domain according to available resource information for the computing domain and the optimal task dispatching decision to obtain an optimal resource allocation decision corresponding to the computing domain; where the available resource information is acquired by the intra-domain controller from a heterogeneous computing platform.

In some embodiments, the computation tasks are dispatched by using an inter-domain controller according to the total computing resources and the attribute features of all the computation tasks to obtain the optimal task dispatching decision specifically includes: according to the total computing resources and the attribute features of all the computation tasks, by using the inter-domain controller and adopting a quantum genetic algorithm, decisions on the computation tasks is made to obtain the optimal task dispatching decision.

In some embodiments, an intra-domain controller is used to allocate resources to computation tasks dispatched to each computing domain according to available resource information of the computing domain and the optimal task dispatching decision to obtain an optimal resource allocation decision corresponding to the computing domain specifically includes: according to the available resource information of the computing domain and the optimal task dispatching decision, by using the intra-domain controller and adopting the quantum genetic algorithm, resources are allocated to the computation tasks corresponding to the computing domain to obtain the optimal resource allocation decision corresponding to the computing domain.

In some embodiments, according to the total computing resources and the attribute features of all the computation tasks, by using the inter-domain controller and adopting a quantum genetic algorithm, decisions on the computation tasks are made to obtain the optimal task dispatching decision, which specifically includes the following steps:

S101, each initial joint task is encoded dispatching scheme to generate an initial population; where the initial population includes several individuals represented by quantum chromosomes, each of the individuals corresponds to one of initial joint task dispatching schemes; and the initial joint task dispatching scheme includes a computing domain allocation result of each computation task;

S102, a fitness of individuals in a quantum population corresponding to current iteration number is computed, and an optimal individual is obtained according to the fitness of all individuals in the quantum population corresponding to the current iteration number;

S103, selection operation, crossover operation and mutation operation are carried out based on a quantum population corresponding to current iteration number of the optimal individual to obtain a next generation quantum population;

S104: Step S102 and Step S103 are repeated until an iteration termination condition is reached to obtain an optimal solution of a task dispatching decision; and the optimal solution of the task dispatching decision is the optimal task dispatching decision.

In some embodiments, an optimal individual is obtained according to the fitness of all individuals in the quantum population corresponding to the current iteration number, which specifically includes: determining an individual corresponding to a maximum fitness among the fitness of all individuals in the quantum population corresponding to the current iteration number as the optimal individual.

In some embodiments, the selection operation, crossover operation and mutation operation are carried out based on a quantum population corresponding to current iteration number of the optimal individual to obtain a next generation quantum population, which specifically includes: a next generation parent population is selected by using a tournament method; where the next generation parent population includes several parent individuals; parent individuals in the next generation parent population are combined by using a quantum crossover operator to obtain a next generation crossover population; the mutation operation are carried out on individuals in the next generation crossover population by reversing an amplitude of the quantum chromosome through a quantum gate to obtain the next generation quantum population.

In some embodiments, each initial joint task dispatching scheme is encoded to generate an initial population specifically includes: each initial joint task dispatching scheme is encoded by using a quantum bit and a quantum superposition state to generate the initial population.

According to the specific embodiment provided by the present disclosure, the present disclosure discloses the following technical effects. A communication and computation integrated network architecture and a resource adaptation method are provided, and the communication and computation integrated network architecture includes a computing service layer, a resource integration adaptation layer and a computation and network component layer. The computing service layer is configured to extract features for each computation task of a computing user according to a QoS requirement and a QoE requirement of the computation task to obtain an attribute feature of the computation task; and the computation task includes determining start and stop of a switch of a train and processing audio/video signals of the train; the resource integration adaptation layer is configured to carry out task dispatching and resource allocation according to total computing resources and attribute features of all computation tasks to obtain an optimal task dispatching decision and an optimal resource allocation decision; the computation and network component layer, including a plurality of types of network components, is configured to forward and process the computation tasks according to the optimal task dispatching decision and the optimal resource allocation decision. The present disclosure integrates various computing paradigms into a unified computing platform, makes up for the defect of loose communication and computing adaptation of the traditional network architecture, thereby achieving efficient global arrangement and dispatch of the massive and highly concurrent computation tasks, and effectively guarantees diversified service requirements of computation tasks.

BRIEF DESCRIPTION OF THE DRAWINGS

In order to illustrate the technical solutions in the embodiments of the present disclosure or in the prior art more clearly, the drawings required in the embodiments will be briefly introduced hereinafter. Apparently, the drawings in the following description are only some embodiments of the present disclosure. For those skilled in the art, other drawings can be obtained according to these drawings without creative labor.

DETAILED DESCRIPTION OF THE EMBODIMENTS

The technical solutions in the embodiments of the present disclosure will be clearly and completely described with reference to the drawings in the embodiments of the present disclosure hereinafter. Apparently, the described embodiments are only some embodiments of the present disclosure, rather than all of the embodiments. Based on the embodiments of the present disclosure, all other embodiments obtained by those skilled in the art without creative labor fall within the scope of protection of the present disclosure.

The purpose of the present disclosure is to provide a communication and computation integrated network architecture and a resource adaptation method. Through ubiquitous connection and synergy computing integration, the communication and computation integrated network architecture ((Com)²Net) can effectively arrange a large number of concurrent computation tasks globally, and effectively support various computing services with different requirements. At the same time, a resource adaptation algorithm based on a Quantum Genetic Algorithm (QGA) is proposed to support inter-domain task dispatching and intra-domain resource adaptation.

In order to make the above objects, features and advantages of the present disclosure more apparent, the present disclosure will be explained in further detail with reference to the drawings and detailed description hereinafter.

Embodiment 1

Figure 1A:
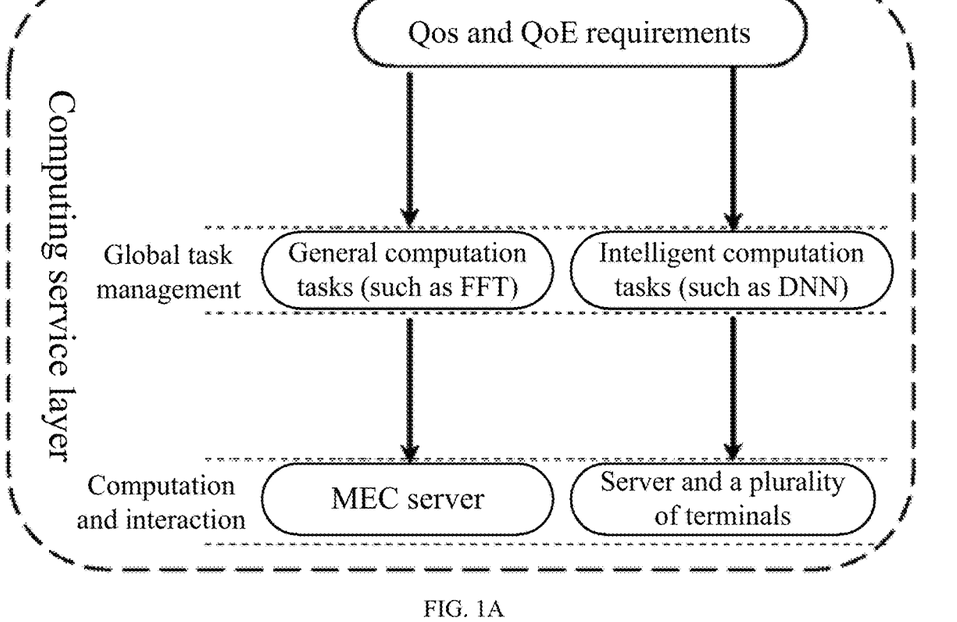
FIGS. 1A-1C are schematic diagrams of a communication and computation integrated network architecture according to Embodiment 1 of the present disclosure.
Figure 1B:
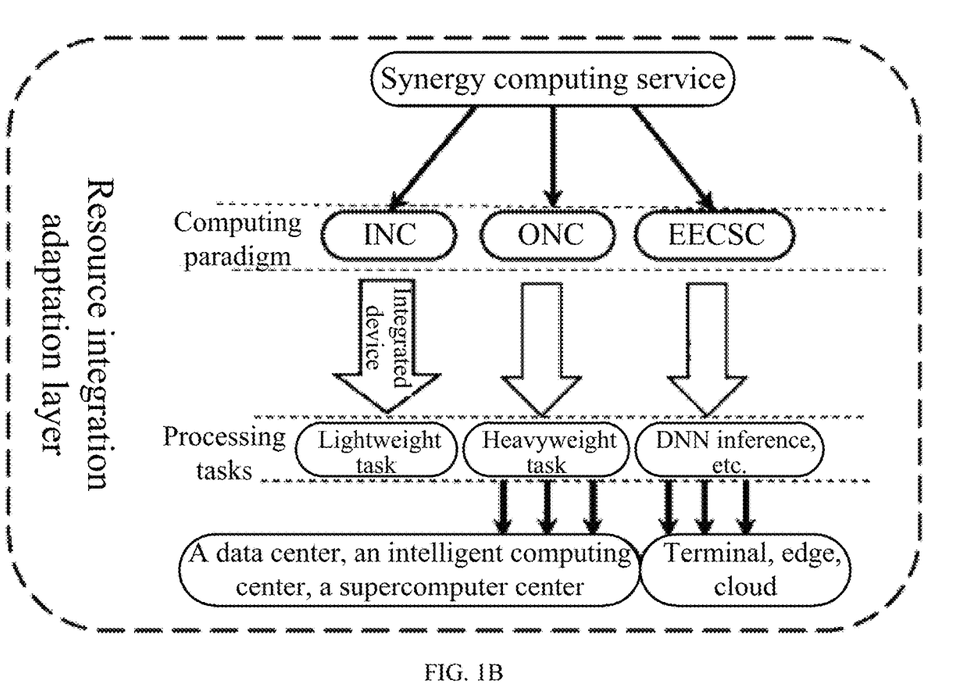
Figure 1C:
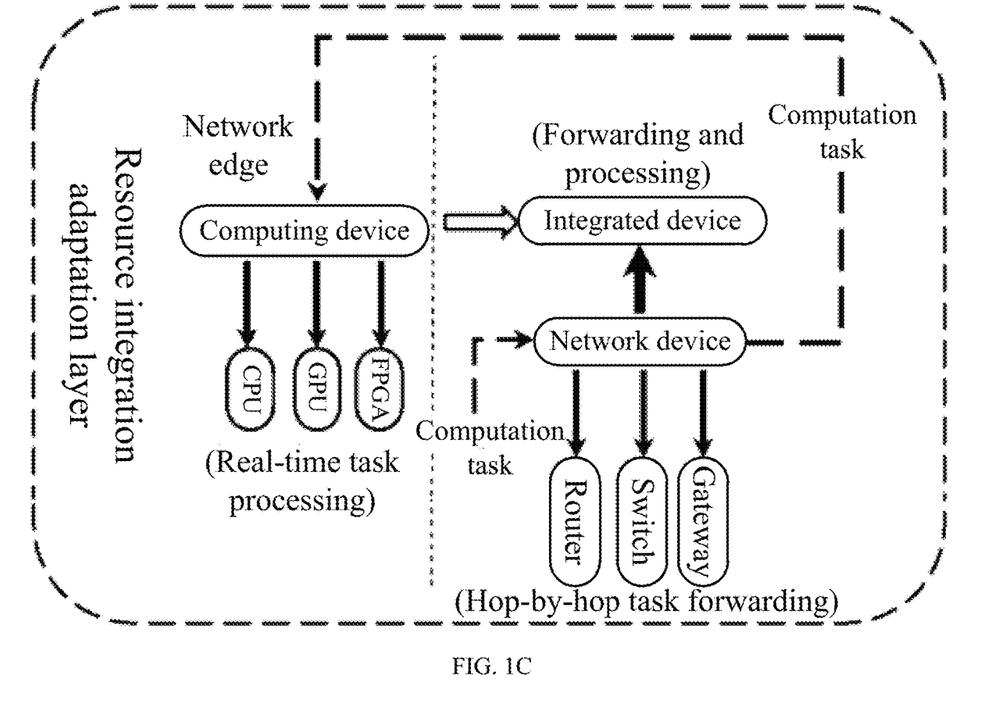

As shown in FIGS. 1A-IC, this embodiment provides a communication and computation integrated network architecture, including three levels: a computing service layer, a resource integration adaptation layer and a computation and network component layer. Various computing paradigms are integrated into a unified computing platform. By synergy among levels, cross-domain dispatching of tasks is achieved, and computation tasks are completed in a manner of cross-domain synergy.

The computing service layer is configured to extract features for each computation task of a computing user according to QoS requirement and QoE requirement of the computation task to obtain attribute features of the computation task; and the computation task includes determining the start and stop of a switch of a train and processing audio/video signals of the train.

The resource integration adaptation layer is configured to carry out task dispatching and resource allocation according to total computing resources and attribute features of all computation tasks to obtain an optimal task dispatching decision and an optimal resource allocation decision.

The computation and network component layer, including a plurality of types of network components, is configured to forward and process computation tasks according to the optimal task dispatching decision and the optimal resource allocation decision.

The computation and network component layer is configured to provide computation and network services for computation tasks. The computation and network component layer includes three types of components: a network device, a computing device and an integrated device. All network components are equipped with a computing unit to process computation tasks.

In the field of ultra-high-speed railway, taking the train operation scene as an example, the computation tasks include the tasks with computing property, such as comprehensively determining the start and stop of the switch of the train and processing audio/video signals of the train, in combination with the multi-dimensional parameters and their state in the train operation in real time. The control flow generated during the start and stop of the train switch is often time-sensitive, while the audio/video signal often has a large amount of data, which requires more computing resources, but has a slightly lower time delay requirement.

Therefore, for computation tasks such as determining the start and stop of the switch, the time delay attribute is extracted and dispatched to a relatively close computing domain with moderate resources for analysis. For computation tasks such as processing audio/video signals, the data size attribute is extracted and dispatched to a domain with stronger processing capacity and more resource allocation.

The network device includes a router, a switch, a gateway, etc., which constitute the core network and are mainly responsible for forwarding hop-by-hop tasks.

The computing device consists of one or more processing modules, such as a Central Processing Unit (CPU), a Graphics Processing Unit (GPU) and a Field Programmable Gate Array (FPGA), which are responsible for real-time task processing.

The integrated device combines the above two types of devices into one device, providing forwarding and processing services for computation tasks.

By introducing computing capacity, the router device can have both forwarding and computing functions. When a computation task passes through a computing-enhanced router device, the computing-enhanced router device can process the task locally or forward the task to other devices.

The computing service layer is configured to provide service-level support for computation and network integration dispatching. The computing service layer includes abstracting the attribute features of various computing services according to their QoS requirement and QoE requirement, and obtaining useful information. The useful information includes whether computation tasks need to be processed on a plurality of computing devices and how many computing devices need to be dispatched to complete the computation tasks. Thereby, based on the useful information, computation tasks are divided into general computation tasks and intelligent computation tasks, which facilitates global task management and division and coordination of computing devices. These key information (useful information) can provide service-level support for computation and network integration dispatching.

The computation process of general computation tasks cannot be divided and needs to be executed on a separate computing device. Taking Fast Fourier Transform (FFT) as an example, computation can be carried out on an Mobile Edge Computing (MEC) server with corresponding mathematical tools. On the contrary, the computation process of intelligent computation tasks can be divided and coordinated among a plurality of computing devices. For example, federated training requires a Deep Neural Network (DNN) model to interact frequently between centralized servers and scattered terminal devices. In the process of coordination, it is necessary to flexibly allocate multi-dimensional resources which include network, computation and storage to support efficient joint training.

The resource integration adaptation layer is configured to effective manage and dispatch multi-dimensional resources. The resource integration adaptation layer includes three computing paradigms: In-Network Computing (INC), Out-Network Computing (ONC) and End-Edge-Cloud Synergy Computing (EECSC) to support synergy computing services. Different computing paradigms are applied to computation tasks with different weight-level.

The INC paradigm can be applied to lightweight computation tasks, for providing on-route computing services through integrated devices deployed along a task transmission path.

The ONC paradigm can be applied to heavyweight computation tasks. The computing capacity can be improved by dispatching computation tasks to geographically scattered data centers, intelligent computing centers and supercomputing centers or by dividing a complete computation task into several parts to be completed together.

The EECSC paradigm can arrange different parts among terminals, edges and clouds.

The key of the above computing paradigm is to establish relationships between services, clusters and components. To this end, dynamic mapping mechanisms of "services to clusters" and "clusters to components" are developed. By accurately sensing differentiated task requirements and multi-dimensional resource attributes, functional modules such as inter-domain dispatching, intra-domain dispatching, computation-oriented routing, computation and network integration adaptation, QoS and QoE guarantee are constructed to realize dynamic mapping between services and components and efficiently support synergy computing services.

Embodiment 2

Figure 2:
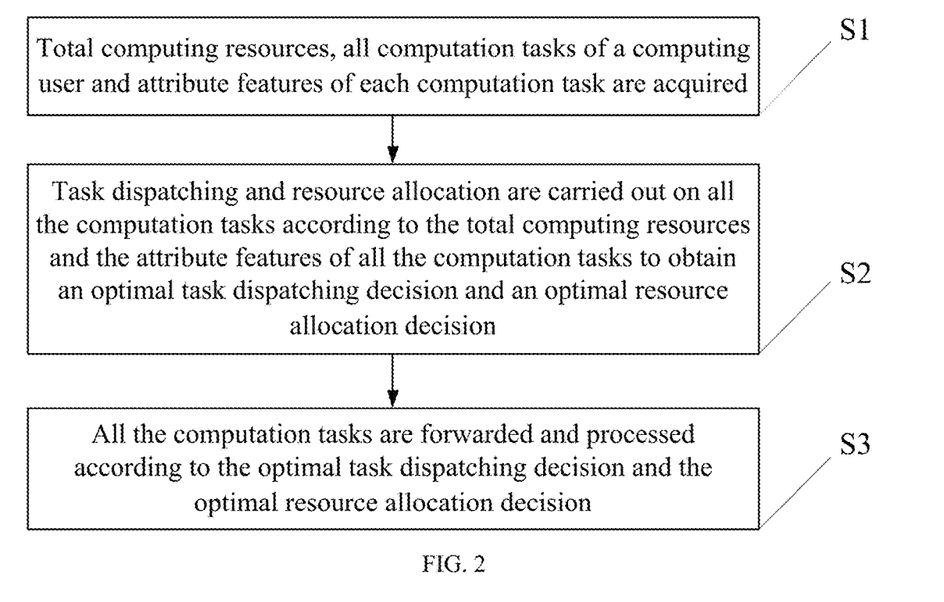
FIG. 2 is a schematic flowchart of a resource adaptation method according to Embodiment 2 of the present disclosure.

As shown in FIG. 2, this embodiment provides a resource adaptation method based on the communication and computation integrated network architecture described in Embodiment 1, which includes the following steps S1-S3.

In step S1, total computing resources, all computation tasks of a computing user and attribute features of each computation task are acquired; where the calculation task includes determining the start and stop of a train and processing audio/video signals of the train.

In step S2, task dispatching and resource allocation are carried out on all the computation tasks according to the total computing resources and the attribute features of all the computation tasks to obtain an optimal task dispatching decision and an optimal resource allocation decision.

In step S3, all the computation tasks are forwarded and processed according to the optimal task dispatching decision and the optimal resource allocation decision.

The resource adaptation algorithm provided by this embodiment includes the synergy between the inter-domain controller and the intra-domain controller. According to the deployment differences, there are inter-domain controllers for cross-domain task dispatching and intra-domain controllers for adaptive configuration of intra-domain resources.

In step S2, task dispatching and resource allocation are carried out on all the computation tasks according to the total computing resources and the attribute features of all the computation tasks to obtain an optimal task dispatching decision and an optimal resource allocation decision which specifically includes the following steps (1) and (2).

(1) The computation tasks are dispatched by using an inter-domain controller according to the total computing resources and the attribute features of all the computation tasks to obtain an optimal task dispatching decision. The optimal task dispatching decision is a joint dispatching scheme of the computation tasks, including the computing domain allocation for each computation task. The total computing resources include available resource information of all computing domains.

Figure 4:
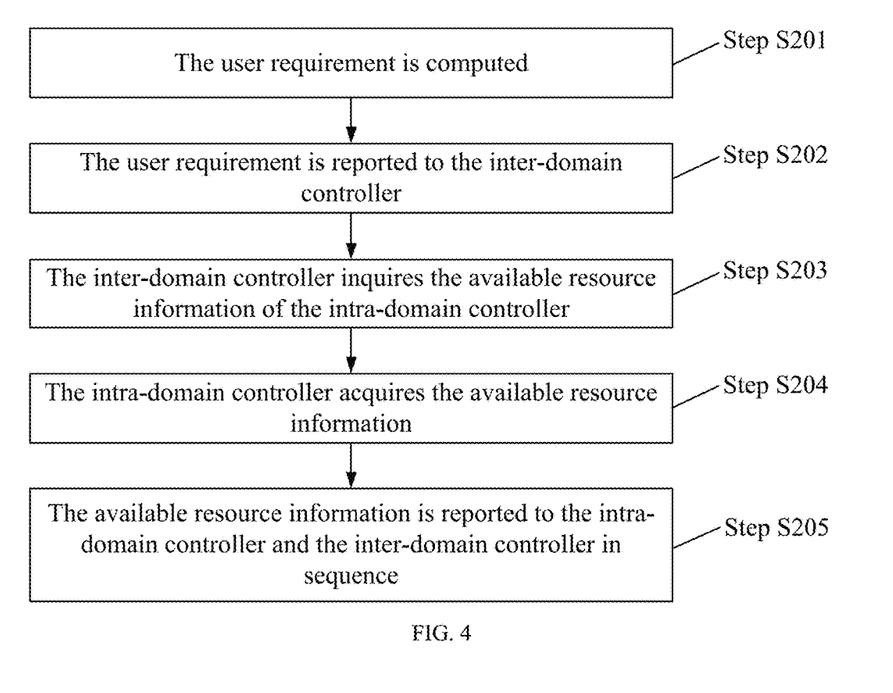
FIG. 4 is a schematic flowchart of (Com)²Net signaling interaction according to the Embodiment 2 of the present disclosure.

In this embodiment, the resource adaptation method includes a signaling interaction process under the (Com)$^2$Net architecture. The resource allocation method based on the QGA realizes inter-domain task dispatching and intra-domain resource allocation through offline optimization and online decision. Its implementation process involves the signaling interaction between computing users, inter-domain controllers, intra-domain controllers and computing platforms, as shown in FIG. 4, and includes the following steps S201-S205.

In step S201, the computing user generates computation tasks with different requirements, and appropriate computing resources (total computing resources) are required to complete the tasks.

In step S202, the user information and the service information are reported to the inter-domain controller for global management, such as task dispatching.

In step S203, the inter-domain controller inquires the available resource information of the selected intra-domain controller.

In step S204, the intra-domain controller acquires the required available resource information from a heterogeneous computing platform through dynamic resource telemetering, that is, the available resource information for each computing domain includes available computing and storage resources, remaining energy supply, resource use price, etc.

In step S205, the required available resource information is reported to the intra-domain controller, and is further reported to the inter-domain controller.

The resource adaptation algorithm based on the QGA is deployed in the inter-domain controller, which can make the global optimal task dispatching decision. It is responsible for carrying out task dispatching across a plurality of domains from a global perspective, and making the optimal decision of task dispatching and resource allocation. After determining the optimal task dispatching decision, two additional strategies can be generated. On the one hand, the resource adaptation algorithm based on the QGA will generate a computing-oriented routing strategy for each task with different computing resource requirements. By implementing the routing strategy to the corresponding network component cluster, massive tasks can be forwarded to a target computing node. On the other hand, a reasonable network bandwidth resource allocation strategy is generated to promote efficient task transmission. Through these decisions and strategies, the established system can realize efficient synergy computing.

(2) For each of the computing domains, according to the available resource information of the computing domain and the optimal task dispatching decision, an intra-domain controller is used to allocate resources to the computation tasks dispatched to the computing domain to obtain the optimal resource allocation decision corresponding to the computing domain. The available resource information is acquired by the intra-domain controller from a heterogeneous computing platform.

Figure 5:
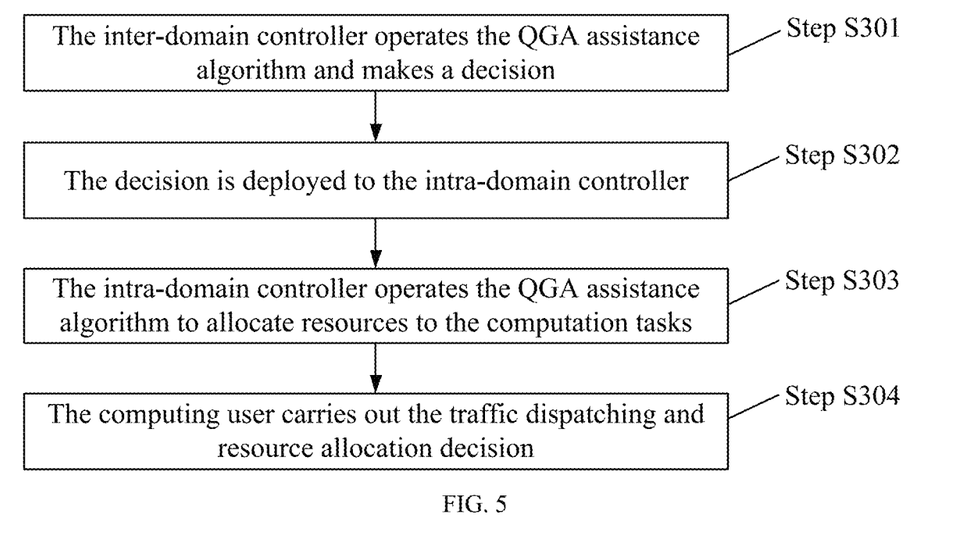
FIG. 5 is a schematic flowchart of task dispatching and optimal resource allocation decision according to the Embodiment 2 of the present disclosure.

As shown in FIG. 5, the task dispatching and the optimal resource allocation decision flow specifically includes the following steps S301-S304.

In step S301, the inter-domain controller operates the resource adaptation algorithm based on the QGA and makes a decision according to the acquired real-time information.

In step S302, the determined optimal task dispatching decision (for example, allocating computation tasks to the corresponding hosts) is deployed to the intra-domain controller.

In step S303, the intra-domain controller operates the resource adaptation algorithm based on the QGA to allocate computing and storage resources to the corresponding computation tasks.

In step S304, the computing user carries out the received task dispatching and optimal resource allocation decision.

The resource adaptation algorithm based on the QGA is deployed in the intra-domain controller, which can locally make the optimal resource allocation decision for the computation tasks dispatched to the corresponding domain. First, the resource information of the computing domain is dynamically telemetered, which includes available computing and storage resources, surplus energy supply and resource use price. Second, heterogeneous computing and storage resources are dispatched synergistically to support task processing. After the sufficient iteration, the resource adaptation algorithm based on the QGA can extract dynamic task information in real time and generate accurate optimal resource allocation decisions. This can effectively ensure the QoS and QoE requirements of computation tasks.

According to the total computing resources and the allocation result of the intra-domain controller, the resources are allocated to the computation tasks to obtain the optimal resource allocation decision, which specifically includes: using a quantum genetic algorithm to allocate resources to the computation task according to the total computing resources and the allocation result of the intra-domain controller to obtain the optimal resource allocation decision.

In a specific example of this embodiment, taking the optimal resource allocation decision as an example, the iterative process of the QGA is introduced in detail. According to the total computing resources and the attribute features of all the computation tasks, by using the inter-domain controller, a decision is made on the computation task with a quantum genetic algorithm to obtain the optimal task dispatching decision specifically includes the following steps S101-S104:

In step S101, each initial joint task dispatching scheme is encoded to generate an initial population. The initial population includes several individuals, the individual is represented by a quantum chromosome, each of the individuals corresponds to one of the initial joint task dispatching schemes. The initial joint task dispatching scheme includes a computing domain allocation result of each of the calculation tasks.

In step S102, the fitness of individuals in a quantum population corresponding to the current iteration number is calculated, and the optimal individual is obtained according to the fitness of all individuals in the quantum population corresponding to the current iteration number.

In step S103, a next generation quantum population is obtain through selection operation, crossover operation and mutation operation based on the quantum population corresponding to the current iteration number for the optimal individual.

In step S104, the Step S102 and the Step S103 are repeated until the iteration termination condition is reached to obtain the optimal solution of the task dispatching decision.

The encoding the computation task and the total computing resources to generate an initial population in step S101 specifically includes: encoding the computation task and the total computing resources by using a quantum bit and a quantum superposition state to generate an initial population.

The obtaining the optimal individual according to the fitness of all individuals in the quantum population corresponding to the current iteration number in step S102 specifically includes: determining the individual corresponding to the maximum fitness among the fitness of all individuals in the quantum population corresponding to the current iteration number as the optimal individual.

The obtaining a next generation quantum population through selection operation, crossover operation and mutation operation based on the quantum population corresponding to the current iteration number of the optimal individual in step S103 specifically includes following steps:

selecting a next generation parent population by using a tournament method; where the next generation parent population includes several parent individuals;

combining parent individuals in the next generation parent population by using a quantum crossover operator to obtain a next generation crossover population;

carrying out mutation operation on individuals in the next generation crossover population by reversing an amplitude of the quantum chromosome through a quantum gate to obtain the next generation quantum population.

The resource adaptation algorithm based on the QGA includes following steps. The chromosomes is encoded by using a quantum bit and a quantum superposition state, so that each chromosome represents information from a plurality of states at the same time. The population is updated by using a quantum rotation gate, and the evolution is guided according to the knowledge of the optimal individual in the current iteration. In the iterative process, the superposition states of each quantum bit gradually tends to a deterministic state and tends to converge, thus achieving the optimization goal.

Figure 3:
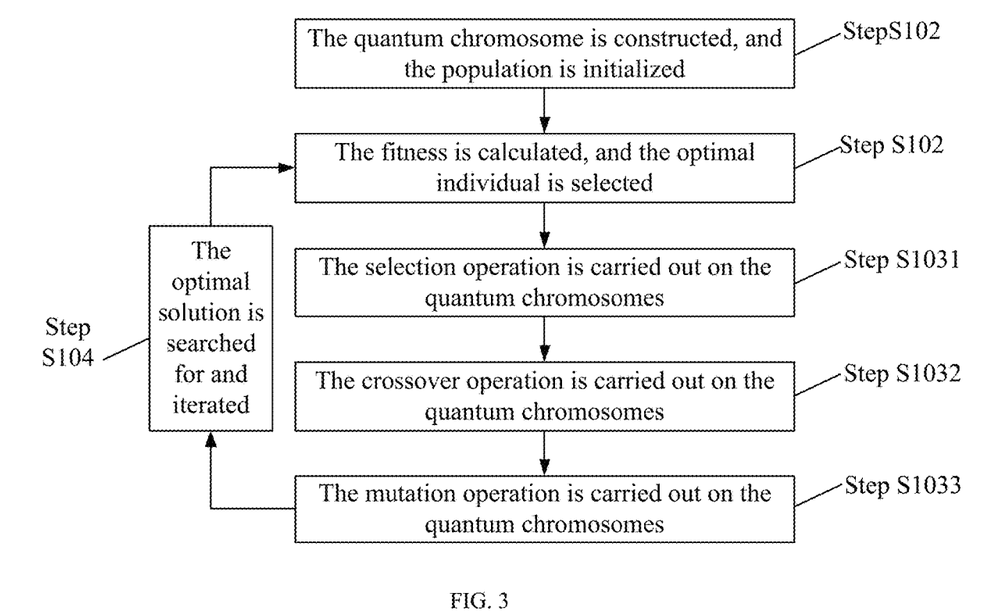
FIG. 3 is a schematic flowchart of iteration of a resource adaptation algorithm based on an Quantum Genetic Algorithm (QGA) according to the Embodiment 2 of the present disclosure.

The resource adaptation method in this embodiment is implemented based on the QGA algorithm. The difference between this algorithm and the traditional genetic algorithm is mainly reflected in population encoding and evolutionary strategies, as shown in FIG. 3.

Taking the iterative process of task dispatching decisions as an example, the iterative process of the resource adaptation algorithm based on the QGA is explained, which includes the following steps.

In step S101, the quantum chromosome is constructed, and the population is initialized.

A population is used to characterize the set of inter-domain joint dispatching or intra-domain resource allocation schemes of all computation tasks, and each individual in the population characterizes one of the schemes. When an individual is represented by a chromosome, the genes (codes) on chromosomes represent the dispatching mode or resource allocation of a computation task.

The quantum chromosome $C_i$ is used to represent the individuals in the population, $C_i = \{c_i^1, c_i^2, \ldots, c_i^D\}$, where D is the length of the chromosome, and the gene on the chromosome is $c_i^k \in [1,m]$, $1 \leq k \leq D$. It should be noted that when the computation task dispatching decision iteration is carried out based on the QGA, $c_i^k$ represents the task dispatching decision for the k-th computation task in this scheme. When the resource allocation decision iteration is carried out based on the QGA, $c_i^k$ represents the intra-domain resource allocation decision for the k-th computation task in this scheme. The parameter m corresponding to the two decisions is different in value. That is, for the task dispatching decision, a plurality of computation tasks can be macroscopically dispatched to x processing domains with varying abundance of available resources through the inter-domain controller. For the resource allocation decision, there are y schemes to allocate given resources (given resources are available resource information in the computing domain) to a plurality of computation tasks in the domain.

Unlike the binary encoding and integer encoding methods of the traditional genetic algorithm, the construction of chromosome uses quantum bits (that is, qubits) and quantum superposition states for encoding, so that each chromosome can simultaneously represent information from a plurality of states.

The individuals form the population $P(j)=\{C_1^j, C_2^j, \ldots, C_p^j\}$, where $C_i^j$ is the individual $C_i$ in the population after a j-th iteration, and p is the number of individuals in the population which corresponds to the potential solution of joint task dispatching (task dispatching decision). Such population corresponds to the potential solution of the resource allocation optimization problem when the resource allocation decision iteration is carried out based on the QGA.

At the beginning of the algorithm, the population is initialized, that is, $P(0)=\{C_1^0, C_2^0, \ldots, C_p^0\}$, where p is the population size.

In addition, a Hadamard gate is used to transform each gene of the chromosome, so that the chromosome can be represented by a uniform superposition state.

In step S102, an appropriate fitness function is formulated, the fitness is calculated, and the optimal individual is selected.

Taking the fitness function $Fit_i$ as the index for selecting the optimal individual, each individual in the population is measured by calculating its corresponding value, and the individuals with low fitness are excluded.

The computation formula for calculating the fitness function is $$Fit_i = \begin{cases} M - f(s_k, a_k), & M > f(s_k, a_k) \\ 0, & \text{otherwise} \end{cases}.$$

Where $f(s_k, a_k)$ is the objective function of the algorithm, and M is the constant used to balance the formula, so as to ensure that the $Fit_i$ value is non-negative.

At the same time, the livability is used to evaluate the solution quality of the genetic iterative process, that is, $$\text{livability} = Fit_i \Big/ \sum_{i=1}^{k} Fit_i.$$

Apparently the greater the livability, the greater the fitness value and the better the individual. However, individuals with greater livability have more chances for regeneration in a next generation, and vice versa. Therefore, it is very important to formulate an appropriate fitness function to ensure the feasibility of candidate individuals.

In step S103, selection operation, crossover operation and mutation operation are carried out on the quantum chromosome.

Taking the optimal individual in the current iteration as the evolutionary goal, the quantum bit code of chromosomes is modified by the operation of the quantum rotation gate to form a next generation population. In the iterative process, the superposition state of each quantum bit gradually tends to be deterministic and convergent, thus achieving the optimization goal. Specifically, the following three processes step S1031-S1033 are carried out to iteratively approach the optimal solution.

In step S1031, in the selection process of quantum chromosomes, a next generation parent population is selected by using a tournament method. First, p/2 individuals are randomly selected from the population, and then the two individuals with the highest livability are selected as the members of the parent population. This process is repeated until the number of parent members is up to p.

In step S1032, in the crossover process of quantum chromosomes, the quantum chromosomes of the parent individuals are combined by using a quantum crossover operator, so that the algorithm can explore a larger solution space by using a quantum principle (such as entanglement, superposition, etc.).

In step S1033, in the mutation process of quantum chromosomes, an amplitude of the quantum chromosomes is reversed by using a quantum gate (such as a Pauli-X gate) to avoid local optima.

In step S104, the optimal solution is searched for and iterated. The step S103 is repeated for selection, crossover and mutation of quantum chromosomes until the iterative termination condition is reached, and the optimal solution of resource allocation, that is, the optimal task dispatching decision, can be obtained.

When determining the optimal resource allocation decision corresponding to each computing domain, the population is a set of resource allocation schemes for the computation tasks dispatched to the computing domain. The individual (quantum chromosome) is one resource allocation scheme for computation tasks dispatched to the computing domain, and the gene (code) on the chromosome represents the resource allocation situation of a specific computation task dispatched to the computing domain. The process of iteratively determining the optimal resource allocation decision corresponding to each computing domain is similar to the above-mentioned determination process of the optimal task dispatching decision, which will not be described in detail here.

Because of the unique encoding and updating technology, the resource adaptation algorithm based on the QGA is superior to the classical genetic algorithm in terms of population diversity, convergence speed and convergence precision.

Figure 6:
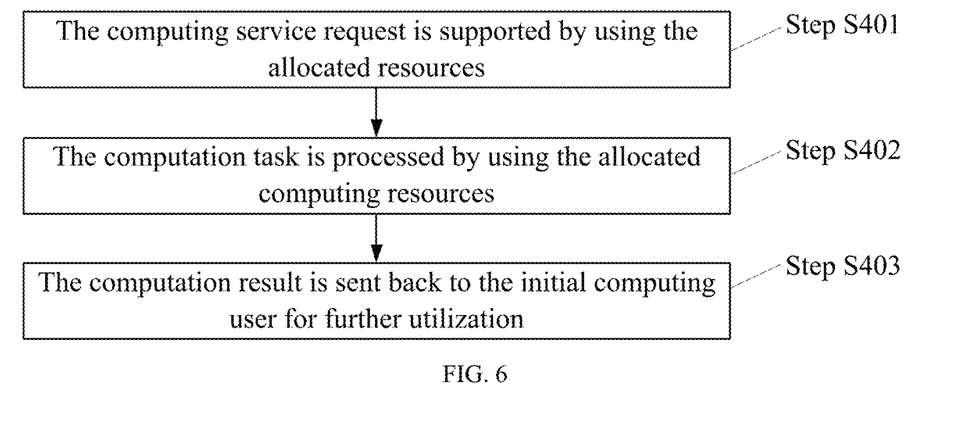
FIG. 6 is a schematic flowchart of a computation process of a computation task according to the Embodiment 2 of the present disclosure.

As shown in FIG. 6, the computation process of the computation task includes the following steps S401-S403.

In step S401, the computing service request is supported by using the allocated network and computing resources. For example, DNN inference tasks can be offloaded to MEC servers using spectrum resources.

In step S402, the computation task is processed by using the allocated computing resources. For example, federated learning tasks can be accelerated using GPU and FPGA resources.

In step S403, the computation result is sent back to the initial computing user for further utilization. For example, an inference precision value of a fault diagnosis application can be returned to an industrial controller to determine whether to take maintenance measures for an industrial device.

In the learning stage, Step S201 to Step S403 are repeated until the resource adaptation algorithm based on the QGA reaches convergence. For each online decision cycle, Step S201 to Step S403 are one-off and have a fast response time. Specifically, in the off-line optimization stage, the algorithm needs multiple iterations to approach the optimal solution, including chromosome construction, initialization, selection, crossover and mutation, which is usually time-consuming. In the online decision stage, the obtained dispatching decision can be deployed to the controller to support inter-domain task dispatching and intra-domain resource allocation, thus achieving a low delay.

The present disclosure has the following beneficial effects. Through the communication and computation integrated network architecture, huge computation tasks can be dispatched across a air-space-ground domain, an end-edge-cloud domain and multi-data-center domain, and ubiquitous connection and synergy computing are promoted, thus supporting various advanced computing services. Furthermore, an intelligent resource adaptation method for dynamic coordination of multi-dimensional resources for massive concurrent computation tasks is proposed. The quantum genetic algorithm is used to make the optimal joint decision on inter-domain task dispatching and intra-domain resource allocation, which can effectively ensure the QoS and QoE requirements of computation tasks.

In this specification, various embodiments are described in a progressive way. The differences between each embodiment and other embodiments are highlighted, and the same and similar parts of various embodiments can be referred to each other.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A communication and computation integrated network architecture, comprising a computing service layer, a resource integration adaptation layer and a computation and network component layer;
   wherein the computing service layer is configured to extract features for each computation task of a computing user according to a quality of service requirement and a quality of experience requirement of the computation task to obtain an attribute feature of the computation task; and the computation task comprises determining start and stop of a switch of a train and processing audio/video signals of the train;
   the resource integration adaptation layer is configured to carry out task dispatching and resource allocation according to total computing resources and attribute features of all computation tasks to obtain an optimal task dispatching decision and an optimal resource allocation decision, which comprises:
   according to the total computing resources and the attribute features of all the computation tasks, by using the inter-domain controller and adopting a quantum genetic algorithm, making decisions on the computation tasks to obtain the optimal task dispatching decision; wherein the optimal task dispatching decision is a joint dispatching scheme of the computation tasks, which comprises computing domain allocation of each of the computation tasks; the total computing resources comprise available resource information of all computing domains;
   for each of the computing domains, according to the available resource information of the computing domain and the optimal task dispatching decision, by using the intra-domain controller and adopting the quantum genetic algorithm, allocating resources to the computation tasks corresponding to the computing domain to obtain the optimal resource allocation decision corresponding to the computing domain; wherein the available resource information is acquired by the intra-domain controller from a heterogeneous computing platform;
   the computation and network component layer, including a plurality of types of network components, is configured to forward and process the computation tasks according to the optimal task dispatching decision and the optimal resource allocation decision.

2. A resource adaptation method based on a communication and computation integrated network architecture according to claim 1, comprising:
   acquiring total computing resources, all computation tasks of the computing user and the attribute feature of each computation task; wherein the computation task comprises determining the start and the stop of the switch of the train and processing the audio/video signals of the train;
   carrying out the task dispatching and the resource allocation on all the computation tasks according to the total computing resources and the attribute features of all the computation tasks to obtain the optimal task dispatching decision and the optimal resource allocation decision, comprising:
   according to the total computing resources and the attribute features of all the computation tasks, by using the inter-domain controller and adopting a quantum genetic algorithm, making decisions on the computation tasks to obtain the optimal task dispatching decision; wherein the optimal task dispatching decision is a joint dispatching scheme of the computation tasks, which comprises computing domain allocation of each of the computation tasks; the total computing resources comprise available resource information of all computing domains;
   for each of the computing domains, according to the available resource information of the computing domain and the optimal task dispatching decision, by using the intra-domain controller and adopting the quantum genetic algorithm, allocating resources to the computation tasks corresponding to the computing domain to obtain the optimal resource allocation decision corresponding to the computing domain; wherein the available resource information is acquired by the intra-domain controller from a heterogeneous computing platform;
   forwarding and processing all the computation tasks according to the optimal task dispatching decision and the optimal resource allocation decision.

3. The resource adaptation method according to claim 2, wherein the according to the total computing resources and the attribute features of all the computation tasks, by using the inter-domain controller and adopting a quantum genetic algorithm, making decisions on the computation tasks to obtain the optimal task dispatching decision comprises:
S101, encoding each initial joint task dispatching scheme to generate an initial population; wherein the initial population comprises a plurality of individuals represented by quantum chromosomes, each of the individuals corresponds to one of initial joint task dispatching schemes; and the initial joint task dispatching scheme comprises a computing domain allocation result of each computation task;
S102, computing a fitness of individuals in a quantum population corresponding to current iteration number, and obtaining an optimal individual according to the fitness of all individuals in the quantum population corresponding to the current iteration number;
S103, carrying out selection operation, crossover operation and mutation operation based on a quantum population corresponding to current iteration number of the optimal individual to obtain a next generation quantum population;
S104: repeating Step S102 and Step S103 until an iteration termination condition is reached to obtain an optimal solution of a task dispatching decision; and the optimal solution of the task dispatching decision is the optimal task dispatching decision.

4. The resource adaptation method according to claim 3, wherein the obtaining an optimal individual according to the fitness of all individuals in the quantum population corresponding to the current iteration number comprises:
determining an individual corresponding to a maximum fitness among the fitness of all individuals in the quantum population corresponding to the current iteration number as the optimal individual.

5. The resource adaptation method according to claim 3, wherein the carrying out selection operation, crossover operation and mutation operation based on a quantum population corresponding to current iteration number of the optimal individual to obtain a next generation quantum population comprises:
selecting a next generation parent population by using a tournament method; wherein the next generation parent population comprises several parent individuals;
combining parent individuals in the next generation parent population by using a quantum crossover operator to obtain a next generation crossover population;
carrying out the mutation operation on individuals in the next generation crossover population by reversing an amplitude of the quantum chromosome through a quantum gate to obtain the next generation quantum population.

6. The resource adaptation method according to claim 3, wherein the encoding each initial joint task dispatching scheme to generate an initial population comprises:
encoding each initial joint task dispatching scheme by using a quantum bit and a quantum superposition state to generate the initial population.

* * * * *